Sept. 28, 1965 W. D. MIMS 3,208,126
METHOD FOR MAKING TRAVELING WAVE TUBES
Filed May 14, 1962 2 Sheets-Sheet 1

INVENTOR.
WILLIAM D. MIMS, JR.
BY
John H. Gallagher
ATTORNEY

Sept. 28, 1965   W. D. MIMS   3,208,126
METHOD FOR MAKING TRAVELING WAVE TUBES
Filed May 14, 1962   2 Sheets-Sheet 2

INVENTOR.
WILLIAM D. MIMS, JR.
BY
John H. Gallagher
ATTORNEY

United States Patent Office 3,208,126
Patented Sept. 28, 1965

3,208,126
METHOD FOR MAKING TRAVELING
WAVE TUBES
William D. Mims, Gainesville, Fla., assignor to Sperry Rand Corporation, Great Neck, N.Y., a corporation of Delaware
Filed May 14, 1962, Ser. No. 194,467
6 Claims. (Cl. 29—25.15)

This invention relates to a method of assembling the internal components of a traveling wave tube within its vacuum envelope, and more particularly relates to a method of securing a helix and supporting insulating rods within the metallic shell of the tube.

The internal structure of a traveling wave tube of the type made by the method of this invention is comprised of a helix slow wave propagating structure that is supported by a plurality of longitudinally extending, equiangularly disposed insulating rods of a material such as ceramic that are in contact with both the outer surface of the helix and the inner surface of the enclosing metallic vacuum envelope of the tube. A number of methods have been proposed for the expedient assembling of these components, but most proposed methods require special tooling that is somewhat difficult to work with. Some methods require that the vacuum shell be thin so as to be deformable, but this results in a finished tube that may not have the required physical ruggedness.

It is an object of this invention to provide an improved method for assemblying a slow wave structure and supporting rods within a vacuum shell of a traveling wave tube.

Another object of this invention is to provide a simplified method for assemblying a slow wave helix and supporting rods within a metallic vacuum shell of a traveling wave tube, said method eliminating the need for special tools and fixtures.

It is another object of this invention to provide a method for assembling a traveling wave tube that requires a minimum number of operations to assemble a slow wave propagating structure and supporting members within an enclosing shell.

A further object of this invention is to provide a simple method of assembling a traveling wave tube that results in a rugged, substantial tube.

A further object of this invention is to provide an improved heat transfer path from the helix to the tube shell by eliminating straps and springs which are often used intermediate these members in known supporting assemblies.

A further object of this invention is to provide an assembly technique which permits the use of a tube shell of small diameter, thereby achieving more efficient electron beam focusing by magnetic structures such as solenoids or periodic permanent magnets.

In accordance with the present invention, a helix of tungsten or molybdenum wire is wound upon a stainless steel mandrel in a conventional manner, and the ends of the helix are secured to the mandrel. The mandrel with the helix thereon, and three dielectric supporting rods disposed about the helix are inserted within a closely fitting metallic shell which will serve as a vacuum envelope of the tube. The shell is made from a material such as stainless steel, copper, or Inconel X. The thermal coefficients of expansion of the mandrel and of the shell are appreciably greater than those of the wire helix and the dielectric rods. The entire assembly then is heated to a temperature that permits the stainless steel mandrel and the metallic shield to expand. The mandrel is permitted to expand to a point where it stretches the wire helix beyond its elastic limit, after which time the entire assembly is permitted to cool. Upon cooling, the mandrel and metallic shell are returned to their original dimensions, but the permanently-stretched helix will retain an enlarged diameter so that the dielectric support rods now are tightly held between the contracted shell and the permanently-expanded helix. The mandrel now may be withdrawn from the expanded helix, leaving the assembled traveling wave tube structure.

The invention will be described by referring to the accompanying drawings wherein.

Figure 1:
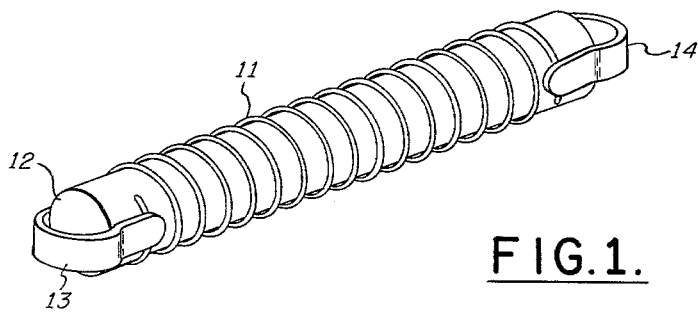
FIG. 1 is a sketch illustrating a helix formed on a mandrel.

Referring now more particularly to the drawings, FIG. 1 illustrates a wire helix 11 of tungsten or molybdenum wire wound upon a stainless steel mandrel 12. The ends of the wire may be secured to the mandrel near the ends by suitable means, such as clamps 13 and 14. The mandrel 12 and the tightly wound helix 11 thereon then are inserted within the metallic shell 18, FIG. 2, as are three dielectric support rods 21, 22 and 23, which may be of a suitable ceramic material. Dielectric support rods 21, 22, and 23 are equiangularly positioned about the exterior of helix 11, in the usual manner. Metallic shell 18 may be of stainless steel, or may be of copper, or the other nonmagnetic materials commonly used in traveling wave tube construction. It is necessary, in accordance with the principles of this invention, that the thermal coefficients of expansion of the outer shell 18 and mandrel 12 be greater than that of the dielectric material of rods 21, 22, and 23, and greater than that of the material from which helix 11 is made. It further is necessary that the mandrel and shell materials be thermal-elastic, that is, they expand when heated and return to their original dimensions upon cooling. In order to avoid compressive forces on the assembly at elevated temperatures, it is necessary that the thermal expansion of outer shell 18 be at least as great as the sum of the thermal expansions of the mandrel 12 and ceramic rods 21, 22, and 23. With a mandrel 12 of stainless steel and shell 18 made of Inconel X, their thermal coefficients of expansion will be considerably greater than the thermal coefficients of expansion of a molybdenum helix, and of high alumina ceramic rods. Traveling wave tubes having the respective component parts of the named materials have been assembled successfully by the method of this invention.

Figure 3A:
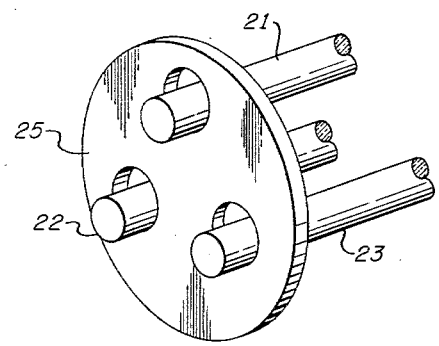
FIGS. 3a and 3b are sketches illustrating means for retaining the supporting rods in their relative positions during the heating operation.
Figure 3B:
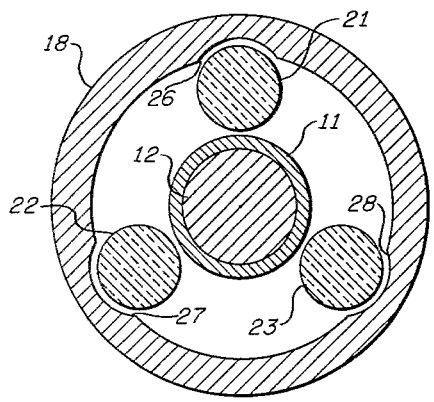
Figure 4:
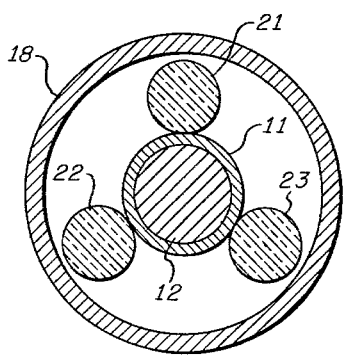
FIGS 4-7 are cross sectional views illustrating the relative positions of the assembled parts before, during, and after the heating of the assembly.

In order to retain the dielectric support rods 21, 22, and 23 in their relative positions during the subsequent steps of this operation, a thin disc-like positioning member 25, FIG. 3a, having three oversized holes therein may be inserted over the ends of the rods 21, 22, and 23 to support them in a non-rigid manner in their desired positions. Other suitable supporting means may be utilized if desired. As an example, the arrangement illustrated in FIG. 3b may be utilized wherein longitudinally-extending concave recesses 26, 27, and 28 may be machined into the inner surface of shell 18, and the dielectric rods 21, 22, and 23 positioned therein. This arrangement has the necessary clearance between the unexpanded helix 11 and the rods, but the clearance is small enough to prevent rods 21, 22 and 23 from becoming dislodged from the positions illustrated. The relative positions of the assembled members prior to heating is illustrated in the cross sectional view of FIG. 4, which illustrates that a slight clearance exists between the rods 21, 22 and 23 and the inner surface of vacuum shell 18. It has been found that the mandrel and helix, and support rods 21, 22, and 23 may be readily inserted within a closely fitting shield 18 with as little as .001 inch clearance.

Figure 2:
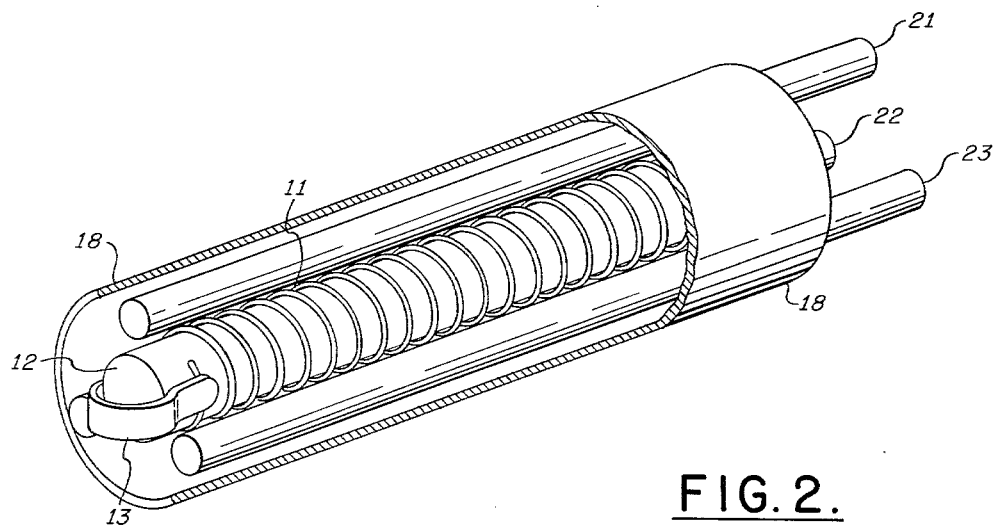
FIG. 2 is a sketch illustrating the mandrel and formed helix, and the dielectric supporting rods inserted within the metallic vacuum envelope or shell, of the tube.
Figure 5:
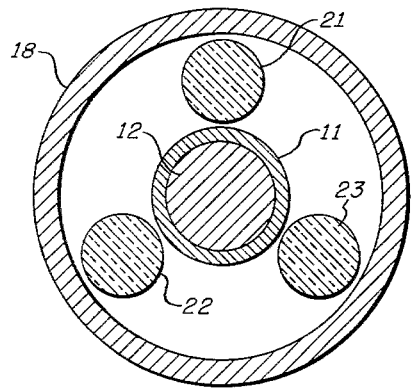
Figure 6:
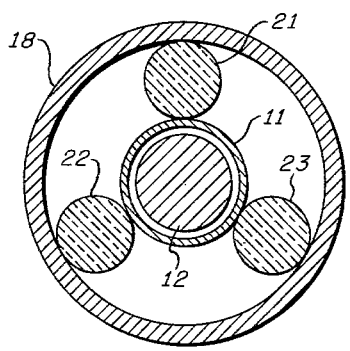
Figure 7:
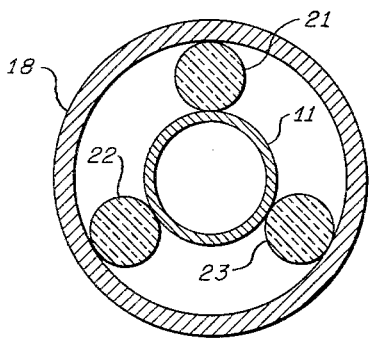

The entire assembly of FIG. 2 now is inserted into an oven and heated to a temperature in the range between 900° and 1200° C., this being considerably higher than the expected operating temperature of the traveling wave tube. During this heating operation, all of the members will expand, but because the stainless steel mandrel 12 and metallic shell 18 have coefficients of expansion considerably greater than that of the tungsten or molybdenum helix 11, they will expand considerably more, as may be seen by the relative positions of the various members as illustrated in FIG. 5. Rods 21, 22, and 23, being of ceramic, will expand less than the mandrel 12 and shell 18. This leaves the assembly rather loose during the heating step and necessitates that rods 21, 22, and 23 be held in their desired positions by the disc-like positioning members 25 of FIG. 3a. This also permits the free thermal expansion of the diameter of mandrel 12 with the helix 11 thereon. During this heating operation, the expanded stainless steel mandrel 12 stretches the tightly-wound helix 11 beyond its elastic limit, this being the only member of the assembly that is stretched in this manner. Upon removing the assembly from the oven and allowing the members to cool, metallic shell 18 and stainless steel mandrel 12 will contract toward their original dimensions, but the diameter of permanently-stretched helix 11 will contract but slightly. Upon finally cooling, metallic shell 18 is back to its original dimensions and supporting rods 21, 22, and 23 now are tightly bound between the inner surface of shell 18 and the outer surface of the permanently-expanded helix 11, as illustrated in FIG. 6. Mandrel 12 also has returned to its original diameter so that the enlarged helix 11 is no longer tightly bound thereon. Mandrel 12 now may be withdrawn. The resulting structure is the desired traveling wave tube structure comprised of the helix 11 and the supporting rods 21, 22, and 23 securely positioned within the metallic vacuum envelope 18, in the manner illustrated in FIG. 7. It may be seen that the completed assembly is of minimum diameter since no additional supporting or securing means are required to hold the rods 21, 22, and 23 in position.

From the above explanation it may be seen that the traveling wave tube structure is assembled to form a rugged unit by a simple method involving a minimum number of steps, and without the need for any special tools or fixtures, except for the simple dielectric rod positioning member 25. A further advantage of the method of this invention is that throughout the entire assembling procedure the helix is never free so that its pitch cannot be disturbed, the uniformity of the pitch being a very important requirement in traveling wave tubes. Additionally, the resulting traveling wave tube structure may be quite rugged if required, inasmuch as the tube shell 18 may be relatively thick and need not have the elastic properties required in other known assembly methods. A further advantageous feature of the assembly method just described is that other portions of the traveling wave tube may be brazed to the helix or shell during the heating step. This feature reduces the time and complexity of assembly for the traveling wave tube. The heating step also has the inherent feature that it anneals the helix, thus eliminating a further additional step in the assembly of the traveling wave tube.

It is to be understood that the specific examples of materials named, and the specific helical slow wave structure are used for descriptive purposes only and that other suitable materials and slow wave structures may be utilized in the practice of the present invention so long as the described relationships between the coefficients of expansion of the various members is maintained.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:

1. A method of mounting a helix and supporting rods within an enclosing shell comprising the steps of
    (a) assembling within a closely-fitting enclosing shell of a thermal-elastic material a plurality of longitudinally-extending support rods disposed about a mandrel of a thermal-elastic material having thereon a tightly-wound helix of a material whose thermal coefficient of expansion is less than that of said mandrel,
    (b) heating the above-named assembly to a temperature to cause said mandrel to expand in diameter and to permanently stretch said tightly-wound helix to an increased diameter,
    (c) cooling said assembly toward its pre-heated temperature to permit the thermal contraction of said shell to its original dimensions to securely bind said rods between said shell and the permanently-expanded helix, and
    (d) removing said mandrel from said permanently-expanded helix.

2. A method of assembling a traveling wave tube comprising the steps of
    (a) assembling within a closely-fitting tubular shell of a thermal-elastic first material a plurality of longitudinally-extending insulating support rods disposed about a mandrel of a thermal-elastic second material having thereon a tightly-wound helix of a third material whose thermal coefficient of expansion is less than that of said first and second materials,
    (b) heating the above-named assembly to a temperature considerably higher than the intended operating temperature of the tube to cause said mandrel to expand in diameter and to stretch said tightly-wound helix beyond its elastic limit,
    (c) cooling said assembly so that the thermal contraction of said shell to its original dimensions securely binds said rods between said shell and the permanently-expanded helix, and
    (d) removing said mandrel.

3. A method of mounting a conductive helix within a metallic enclosing shell comprising the steps of
    (a) winding onto a mandrel of a thermal-elastic material a helix of a conductive material having a lower thermal coefficient of expansion than that of said mandrel,
    (b) assembling said mandrel and helix thereon with a plurality of longitudinally extending supporting rods thereabout into a closely-fitting thermal-elastic shell having a greater thermal coefficient of expansion than that of said helix and said rods,
    (c) heating said named assembly to a temperature considerably higher than the intended operating temperature of said tube to cause the mandrel to expand in diameter and permanently stretch the helix to an enlarged diameter,
    (d) cooling said assembly to permit the thermal contraction of said shell to its original diameter to securely bind said rods between said shell and the permanently expanded helix, and
    (e) removing said mandrel from said permanently-expanded helix.

4. A method of assembling a traveling wave tube comprising the steps of
    (a) assembling within a closely-fitting metallic shell of a thermal-elastic first material a plurality of longitudinally extending insulating support rods equi-angularly disposed about a thermal-elastic mandrel having thereon a tightly-wound conductive helix of a material whose thermal coefficient of expansion is less than that of said shell and said mandrel, (b) supporting said rods in a non-rigid manner in their equiangular relationship, (c) heating the above-named assembly to a temperature considerably above the intended operating temperature of said tube to cause said mandrel to expand in diameter and stretch said tightly-wound helix beyond its elastic limit, (d) cooling said assembly toward its pre-heated temperature to permit the thermal contraction of said shell to its original dimensions to securely bind said rods between said shell and the permanently-expanded helix, and (e) removing said mandrel from said assembly.

5. A method of mounting a helix and supporting rods within an envelope comprising the steps of (a) winding onto a mandrel of a thermal-elastic first material a helix of a second material having a lower thermal coefficient of expansion than that of said first material, (b) assembling said mandrel and helix thereon with a plurality of longitudinally-extending supporting rods thereabout into a closely-fitting thermal-elastic envelope having a greater thermal coefficient of expansion than that of said helix and said rods, (c) heating said named assembly to a temperature to cause the mandrel to expand in diameter and stretch the helix material beyond its elastic limit, (d) cooling said assembly until the thermal contraction of said envelope to its original dimensions causes said rods to become fixed between said envelope and the permanently-expanded helix, and (e) removing said mandrel.

6. A method of mounting a conductive helix within a metallic envelope comprising the steps of (a) winding onto a mandrel of a thermal-elastic first material a conductive helix of a second material having a lower thermal coefficient of expansion than that of said first material, (b) securing the ends of the formed helix to said mandrel, (c) positioning a plurality of longitudinally extended insulating rods about the exterior of said helix, (d) inserting said mandrel and helix thereon and the plurality of insulating rods within a closely-fitting metallic shell of a thermal-elastic material whose thermal coefficient of expansion is greater than that of said helix and said rods, (e) heating the assembled shell, dielectric rods, helix and mandrel to a temperature sufficient to cause the mandrel to expand in diameter and thereby stretch the helix material beyond its elastic limit, (f) cooling said assembly until the thermal contraction of said shell to its original dimensions causes said rods to become fixed between said shell and the permanently-expanded helix, and (g) removing said mandrel.

References Cited by the Examiner

UNITED STATES PATENTS

| | | | |
|---|---|---|---|
| 2,812,499 | 11/57 | Robertson | 29—25.15 |
| 2,922,067 | 1/60 | Van Dien | 29—25.15 |

RICHARD H. EANES, JR., *Primary Examiner.*